UNITED STATES PATENT OFFICE.

ALEX B. DAVIS, OF INDIANAPOLIS, INDIANA, ASSIGNOR TO THE ELI LILLY AND COMPANY, OF INDIANAPOLIS, INDIANA, A CORPORATION OF INDIANA.

CRESOL CONDENSATION PRODUCT.

1,213,465. Specification of Letters Patent. Patented Jan. 23, 1917.

No Drawing. Application filed June 7, 1916. Serial No. 102,311.

*To all whom it may concern:*

Be it known that I, ALEX B. DAVIS, a citizen of the United States, residing at Indianapolis, Marion county, and State of Indiana, have invented and discovered certain new and useful Improvements in Cresol Condensation Products, of which the following is a specification.

The invention relates to condensation products derived from the cresols and the higher alcohols. They are of value as germicides.

I have found that if the cresols and certain other methylated phenols of the same general characteristics be mixed with the higher alcohols, such as isobutyl alcohol, isoamyl alcohol, or fusel oil and to this mixture a dehydrating agent be added and the resulting mass heated to a high temperature, condensation takes place with the elimination of one or more molecules of water. Thus ortho cresol and isobutyl yield principally isobutyl-o-cresol, and its isobutyl ether. It is not intended that any one particular compound produced in any of these condensation reactions shall be isolated for use, but that a certain fraction or fractions boiling over a fairly wide range of temperature shall be taken for use, except in cases where the condensation product consists mainly of one compound which may be easily brought to a fairly high degree of purity by fractional distillation.

In carrying out the process, one may proceed as follows:—550 parts by weight of ortho cresol are mixed with 500 parts (more than one molecular proportion) of isobutyl alcohol and about 1000 parts of anhydrous zinc chlorid added. The mixture is heated with constant stirring until the reaction starts, which as a rule is about 170° C. The heating and stirring are continued until the zinc chlorid has all dissolved and then some time longer until the mass shows signs of separating into two layers. The heat is then discontinued and the reaction allowed to proceed as far as it will. After two hours' time, as a rule, no further reaction takes place and the somewhat cooled mass is mixed with twice its volume of water, the lower layer containing the zinc chlorid in solution separated, the upper layer washed once or twice with water acidified with hydrochloric acid, and then distilled. Nearly the entire mass comes over between 210° C. and 290° C. as a clear yellow oil. The fraction below 210° consists mainly of uncombined alcohol and above 290° of a heavy tar that boils with decomposition.

What I claim is:—

1. The condensation products of methylated phenols with the higher alcohols.
2. The condensation products of the cresols with the higher alcohols.
3. The condensation products of ortho cresol and a higher alcohol.
4. The condensation products of cresol and a butyl alcohol.

In witness whereof, I have hereunto set my hand and seal at Indianapolis, Indiana, this twenty-fifth day of May, A. D. nineteen hundred and sixteen.

ALEX B. DAVIS. [L. S.]

Witnesses:
A. C. RICE,
H. P. DOOLITTLE.